April 3, 1962    E. H. LE MENSE    3,028,312
METHOD FOR CULTIVATING MICROORGANISMS
Filed Sept. 21, 1959
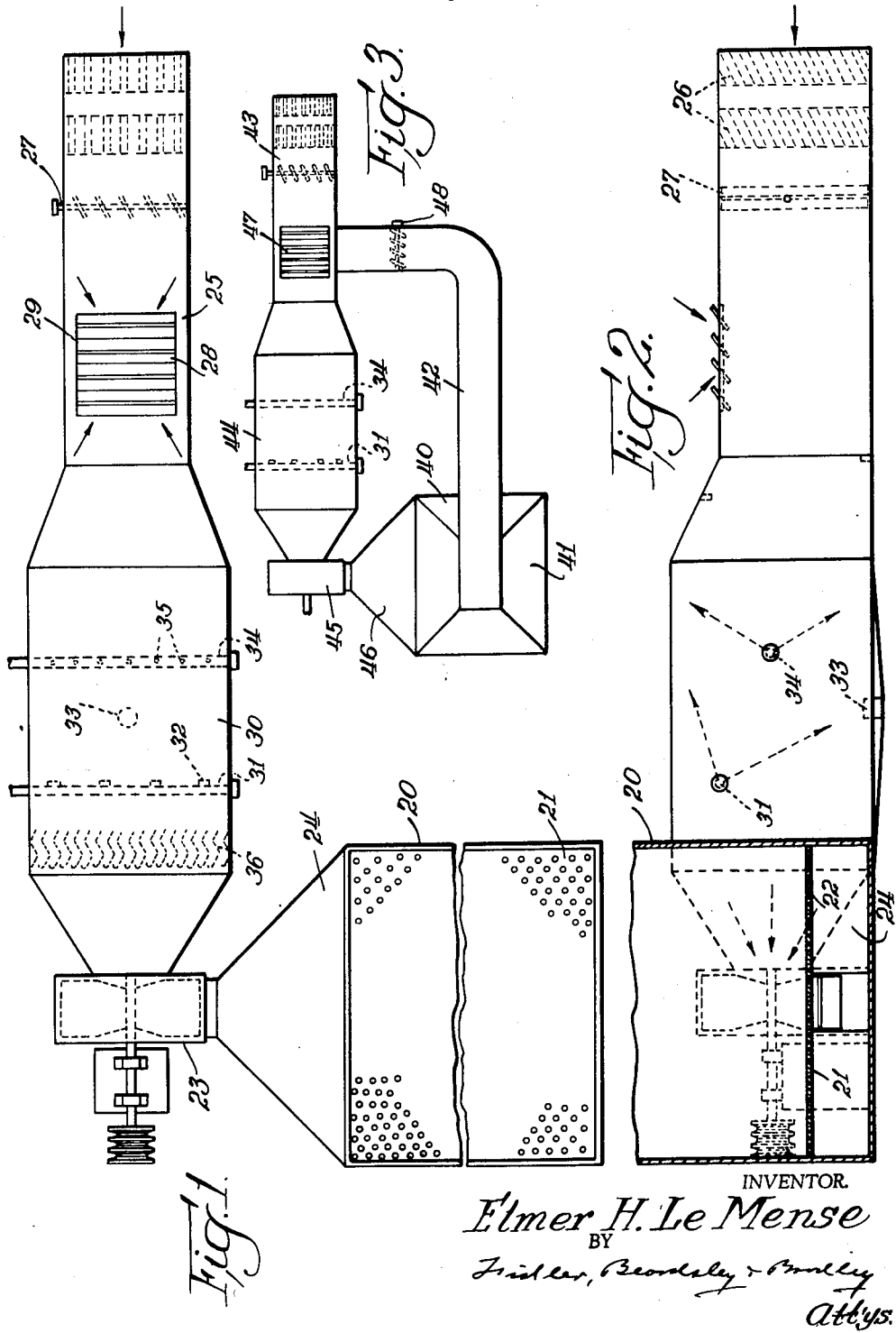
INVENTOR.
Elmer H. Le Mense
BY
Fisher, Beardsley & Bailey
Attys.

United States Patent Office 3,028,312
Patented Apr. 3, 1962

3,028,312
METHOD FOR CULTIVATING MICROORGANISMS
Elmer H. Le Mense, 1490 Cajon Drive, Hemet, Calif.
Filed Sept. 21, 1959, Ser. No. 841,277
4 Claims. (Cl. 195—95)

This invention relates to a method of and apparatus for cultivating microorganisms and has to do more particularly with the cultivation of microorganisms on a solid or semi-solid culture medium.

In prior production methods for cultivating microorganisms usually a liquid medium has been employed. The culture liquors are then processed for the ingredients they contain, as in the case of riboflavin production, or the microorganisms themselves are separated and recovered, as in food yeast propagation. In general, a liquid culture medium adapts itself to large scale production methods inasmuch as it permits accurate control of cultural conditions, especially with respect to temperature, aeration and humidity.

In certain cases it is desirable to cultivate microorganisms on a solid or semi-solid culture medium or substrate instead of employing a liquid culture medium. For example, in certain processes the substrate is a solid of such nature that such substrate, as well as the microorganisms and the products elaborated by the microorganisms, may be used without separation. In fact, in some processes, the combination of solid substrate, microorganisms and products of the microorganisms is a desired end product and separation is undesirable. In such cases substantial economies may be realized by eliminating the separation step which often is necessary where a liquid culture medium is employed. One example of a process wherein a solid or semi-solid substrate is employed and separation is undesirable is the preparation of new animal feed ingredients by culturing on a solid or semi-solid substrate consisting of certain natural animal feed ingredients, bacteria which elaborate growth-promoting factors of such nature as to provide desirable growth in animals and poultry.

It has been found, however, that in the cultivating of microorganisms on a solid or semi-solid substrate, it is extremely difficult to maintain close control over the temperature, aeration and humidity of the inoculated mass of substrate necessary to promote proper growth of the microorganisms. This is especially true in the case of large scale production where the mass of substrate material is of substantial size.

Where a substrate consisting of a solid or semi-solid material is inoculated with microorganisms which undergo growth at a rapid rate, substantial metabolic heat is developed. The properties of thermal insulation possessed by the substrate may be such that the heat developed is not carried away and the temperature of the mass may become so great as to inhibit optimum growth of the microorganisms and may even result in the death of the organisms. Moreover, many microorganisms require substantial quantities of oxygen and moisture in order to sustain the activity and growth of the organisms and permit full development of the process.

An object of the present invention is to provide a new and improved method of cultivating microorganisms on a solid or semi-solid culture medium.

Another object is to provide a method of cultivating microorganisms on a solid or semi-solid culture medium economically on a relatively large scale and under closely controlled conditions of growth.

Another object is to provide a method of cultivating microorganisms on a solid or semi-solid culture medium wherein the temperature, humidity and aeration conditions may be readily and closely controlled.

A further object is to provide new and improved apparatus for cultivating microorganisms on a solid or semi-solid culture medium whereby the conditions of growth may be closely controlled.

A still further object is to provide apparatus for cultivating microorganisms on a solid or semi-solid culture medium wherein the temperature, humidity and aeration, or any of them, may be closely controlled to provide optimum growth of the microorganisms.

Other objects and advantages of the invention will appear from the following description taken in connection with the appended drawings, wherein:

FIG. 1 is a top plan view of a preferred embodiment of apparatus constructed in accordance with the invention;

FIG. 2 is a fragmentary side elevational view of the apparatus of FIG. 1; and

FIG. 3 is a somewhat diagrammatic top plan view of another form of apparatus in accordance with the invention.

The present invention is well adapted for use in connection with a number of processes for the cultivation of microorganisms on solid or semi-solid culture media and is particularly well adapted for application to a process, such as disclosed in my U.S. Patent No. 2,738,274 dated March 13, 1956, for Ingredients for Poultry and Animal Feeds and Process for Preparing the Same, although it will be understood that the present invention is not limited to such specific application.

In accordance with my invention, a solid or semi-solid substrate material is employed which consists of fibrous, granular or other relatively finely divided vegetable or mineral material, which material is adapted to be arranged as a mass having pores or interstices therein providing an extensive surface on which the microorganisms may be deposited for cultivation, in condition to be accessible to air for supporting the growth of the microorganisms.

The substrate preferably is of such nature that it is not necessary to separate it from the product elaborated by the microorganisms upon completion of the process. For example, where the process is used to produce a poultry or animal growth factor, as in my said patent, the substrate is a material which may be safely ingested by the poultry or animal and preferably is itself a nutrient for the poultry or animal. Where the product is adapted for other purposes the substrate is a material which aids in the use of the product but in any event is not inimical to the product or to its intended use. For example, it may be desired to spread or dust the product on plants in which case the vegetable or mineral substrate is one which may be finely ground and which will not adversely affect the plant. I have found that a substrate formed from one or more of the materials disclosed in my said patent to be suitable in many instances, namely: bran (wheat), middlings (wheat), red dog flour, alfalfa meal, soy bean meal, distiller's solubles (from cereals or tubers), distiller's dried grains (from cereals or tubers), corn meal, peanut meal or flour, oat hulls, rice hulls, oat meal, corn stalks (ground or shredded), corn cobs (ground), kudzu vines (ground or shredded), sorgo or sorghum stalks (ground or shredded), beet pulp (ground), soy bean vines (ground), sweet potatoe vines (ground), sweet potatoes (chopped or ground), Irish potatoes (chopped or ground), cotton seed meal and other like vegetative substances. Also, I have found that certain materials such as sponge rock, lava rock, coke oven residue, pumice, charcoal, perlite, vermiculite and other highly porous non-vegetative materials can be used as such or in combination with the aforementioned vegetative materials to provide excellent supporting substrates for the cultivation of microorganisms. The substrate may be reduced to desired fineness by chopping, shredding or grinding or otherwise reducing the material from which it is formed to the desired particle size, unless of course such material already is of the desired size. Preferably, the particles are of such size and shape that when in a mass provide interconnected pore or openings throughout the mass of a suitable size. I have found that excellent results may be obtained where the substrate material is of a particle size approximately the size of poultry feed ingredients.

The substrate material preferably is sterilized before being inoculated, in order to prevent subsequent activity, during incubation, of any foreign microorganisms which may be present in the material forming the substrate and which may detrimentally affect the process.

The substrate material is inoculated with the microorganisms to be cultivated as by mixing with the substrate material a liquid culture of the microorganisms, thereby causing the microorganisms in their liquid environment to adhere to the particles constituting the mass of substrate material. During incubation of the microorganisms, a tempered and humidified air is passed through the mass at a temperature and rate sufficient to carry off the metabolic heat generated in the mass of substrate, to thereby maintain the temperature of the mass suitable for growth of the microorganisms, and preferably at the value which will insure the optimum growth of the organisms.

The air is passed through the mass of inoculated substrate material in direct contact with the material and is saturated with moisture in order to prevent excessive evaporation of water from the mass which would inhibit the growth of the microorganisms through its cooling and drying effects. Air is circulated through and in direct contact with the particles of substrate and provides not only the necessary withdrawal of heat but also furnishes sufficient oxygen to permit a vigorous, preferably optimum, growth of the microorganisms. Such air may be passed through the mass and vented to the atmosphere or, if desired, may be recirculated in a closed circuit through the mass in order to permit economy of operation.

My invention also includes novel apparatus which is especially well adapted for carrying out the process above described.

This apparatus is illustrated in FIGURES 1 to 3 of the drawings and includes a bin-type container 20 having a removable cover (not shown) permitting ready introduction of material to be cultured. The bin 20 has a floor 21 spaced above the bottom of the bin to support the mass of material, which floor is provided substantially throughout its extent with spaced perforations 22 which permit air to be passed upwardly through the mass of material supported on the floor 21, as hereinafter described. A fan 23 of any suitable construction and driven by suitable means (not shown) is connected to the bin 20 by a manifold duct 24 leading into the bin at the portion thereof below the floor 21.

An inlet duct 25 is connected to the inlet of the fan 23 and includes therein means for conditioning the air drawn into the fan to provide the desired temperature and humidity for both incubation and subsequent dehydration of the mass. To this end, there is provided adjacent the intake end of the duct, one or more heating units 26 for heating the incoming air for drying purposes as will hereinafter appear. The heating units may take various forms so long as they do not introduce undesirable foreign matter into the air stream, and electric grid type units have been found very satisfactory, although steam coils also have been found satisfactory. A flow control device 27 such as a gang of dampers either manually or automatically controlled is provided for controlling the intake of air through the end of the inlet duct 25, whereby the rate of flow of air drawn into the end of the duct may be suitably controlled.

An inlet opening 28 is provided in the duct 25 preferably in the top wall thereof, for admitting air for incubating purposes. An air intake control 29 which may take the form of a gang of dampers, which may be either manually or automatically controlled, is provided for controlling the admission of air into the inlet duct 25. While the rate of flow of air through the duct 25 and the bin 20 may be controlled by varying the speed of the blower fan, preferably the rate of flow is controlled by the dampers 29 and the dampers 27 so that the blower fan can be operated at a constant speed and thus at maximum efficiency.

Connected between the inlet duct 25 and the fan 23 is a humidifying unit 30 for insuring proper humidity of the air drawn into the fan casing through the inlet duct and forced through the fermenting mass in the bin 20. The humidifier 30 includes a casing in which is disposed a steam head 34 having a plurality of jet openings 35 therein which steam head is connected to a source of raw steam and is adapted to inject steam into the current of air passing through the humidifier for the purpose of heating the air to the desired temperature. The steam also serves to supply moisture to the air so that a condition of near saturation at the elevated temperature is attained.

The humidifying unit also includes a water spray head 31 connected to a suitable source of water supply (not shown) under pressure and which spray head has a plurality of spray nozzles 32 so arranged as to project a finely divided or "atomized" jet of water into the oncoming stream of humid hot air. The spray nozzles are so arranged that a relatively wide-angle jet is projected into the air current to thereby introduce water into all portions of the current of air. The water spray effectively washes and purifies the steam laden air and at the same time provides sufficient cooling to permit more accurate control of the temperature and relative humidity of the incoming air.

A drain 33 may be provided for draining from the humidifier casing excess water which collects on the floor of the casing.

A series of baffles 36 preferably are provided at the discharge end of the humidifier which cause the air to follow a tortuous path and to throw out any entrained water. Such water drains to the bottom of the humidifier and may be withdrawn. Removal of this excess water prevents it from being carried into the fan and the fermenting mass.

In carrying out the invention, the inoculated substrate material is inserted in the bin 20 without compacting, the mass formed by the substrate material being sufficiently porous to permit air to pass therethrough. The mass should not be of such depth as to unduly impede the flow of air therethrough or to prevent adequate cooling of the upper portion of the mass. However, because of the continuous circulation of air through the mass under appreciable pressure the mass may be relatively deep. In one example, excellent results were obtained by employing a layer of inoculated material approximately 3 feet in depth. In this example, the perforations in the floor of the bin were ⅛ inch in diameter and were spaced apart approximately 1 inch, the air being under a head equal to approximately 6 inches of water.

After a predetermined period of incubation the fan is started, the dampers 27 at the inlet end of the duct having been closed and the dampers 29 at the top of the duct having been opened so that air is drawn into the duct 25 through the opening 28. The heaters 26 preferably are turned off since no air is being drawn therepast. During operation of the fan, air is drawn through the humidifier 30 and forced into the bin 20 below the floor 21 and thence through the perforations 22 and through the mass of material undergoing incubation. In the form of apparatus shown, the air is discharged into the atmosphere from the bin. The air, in passing through the conditioning unit 30 is washed, humidified and heated to the desired temperature. After the mass has fermented for the desired period, the steam and water are turned off and the heaters 26 energized and with dampers 29 closed the dampers 27 are opened to permit air to be drawn into the duct through the end thereof. Such air is, therefore, warmed by the heaters and forced into and through the mass to dry the same and thereby halt further activity of the micro-organisms and at the same time to condition the material for storage or shipment.

By way of illustration of the invention in accordance with the embodiment just described, one specific example is given. In this example a mixture of 500 pounds of soy bean meal (coarsely ground), 200 pounds of wheat bran flakes, 200 pounds of alfalfa leaf meal, 90 pounds of red dog flour, 5 pounds of sucrose and 5 pounds of calcium hydroxide was placed in a horizontal batch mixer and thoroughly blended. While being agitated the mixture was moistened with 35 gallons of water and then heat sterilized by passing raw steam into the mass for a period of 30 minutes after which it was cooled to 33° C. The mixture was then inoculated by spraying 85 gallons of an actively growing bacterial culture into the agitating mass of sterile medium. The inoculum consisted of a pure culture of a spore forming bacillus grown for 24 hours at 30° C. in a aerated liquid culture medium made up of 2% corn steep, 1% peptone, 2% dextrose and 95% water.

The inoculated soybean-bran medium was then transferred to the incubation bin to give a loosely packed layer about 27 inches in depth. The layer of inoculated material was allowed to lie quietly for about 90 minutes at which time its temperature had risen to 38° C. At this point the blower fan was turned on and steam and water introduced into the air duct leading to the blower fan for the purpose of warming and humidifying the incoming air. The conditioned air at a temperature of 30° C. and at a relative humidity of 78% was forced by the blower fan at a pressure differential of 5 inches of water upward through the bran mix at the rate 0.4 volume of air per volume of fermenting medium per minute. In 20 minutes the temperature of the fermenting mass was brought down to approximately that of the incoming air (28° to 32° C.). This temperature was maintained for approximately 42 hours at which time microscopic examination showed that the bacteria had passed through the vegetative growth stage and were well sporulated. At this point the steam and water were turned off and the dry air heater turned on so that the air reaching the blower fan and forced through the medium was warm and dry. In 24 hours the moisture content of the mixture was reduced to approximately 10% by weight.

While there are set out above certain specific values for the factors involved in a specific embodiment of the process, it will be understood that the invention is not thus limited and that such values may be varied. For example, although a condition of near saturation of the air is desirable, satisfactory results have been obtained with a relative humidity varying from about 65 percent to 100 percent. Of course, during drying, the relative humidity of the air is kept as low as practicable.

The temperature of the air during incubation should, of course, be maintained at the optimum for growth of the particular organisms being cultivated. Thus, the temperature of the air ranges from about 22° C. to about 38° C. During drying, the temperature of the air is preferably somewhat higher but does not exceed about 60° C. While the temperature during drying is not very critical and may vary substantially, I prefer to maintain it within the range of about 30° C. to about 60° C.

The pressure of the air being introduced into the substrate during incubation varies with the depth of the layer of substrate material and with the density or porosity of the substrate material. The substrate may vary from light, porous material to heavy, dense material, and the depth may range from a few inches to many feet. As a practical and exemplary range, the bed may be from about four inches to about four feet in thickness. Hence, the range of pressure of the incubation may vary widely as, for example, from about 0.10 p.s.i. to about 6.0 p.s.i.

The foregoing process and apparatus permits not only the maintenance of the proper temperature for optimum growth of the microorganisms, but at the same time, permits the supply of adequate moisture and oxygen. The process permits relatively deep layers of materials to be fermented without danger of overheating, thereby permitting large scale production in a relatively small process area. Moreover, the drying of the material may be effected without removing it from the bin so that the material, when removed from the bin, is ready for storage or packaging, thus permitting the realization of substantial economies in handling.

It has been found that in some instances it is desirable to re-cycle the air which has been passed through the fermenting mass carrying it past the heating and humidifying means and through the fermenting mass repeatedly. Such re-cycling permits the maintaining of the desired ratio of carbon dioxide (or other respiration gases) to oxygen in order to meet different conditions of fermentation where different materials and different organisms are employed. Suitable proportions of such gases may be introduced into the air stream at any point ahead of the fermenting mass as, for example, by introducing them through the opening 28. Moreover, re-cycling of the air permits operating economies (as, for example, reduction in the steam requirements) over those which would be met were the air not recirculated. Recirculation of the air may be accomplished by providing a hood over the top of the bin shown in FIG. 1 and connecting such hood by a suitable conduit back to or near intake opening 28 of duct 25.

Apparatus of a construction suitable for re-cycling the air is illustrated in FIG. 3 wherein a bin 40 is provided having a hood 41 connected by a return conduit 42 leading into the side of duct 43. The inlet duct 43 is connected to a humidifier 44 which, in turn, is connected to a fan 45, the outlet of which discharges into a manifold 46 leading to the bottom of the bin 40. The inlet duct 43 is provided with a damper opening 47 and damper 50 for admitting outside air into the system. Duct 42 is also provided with a damper opening 49 and a damper 48 which when operated in conjunction with damper 47 permits control of the amounts of re-cycled and fresh air entering the system. Also, damper 48 permits closing off the recirculating equipment during drying operations. The inlet duct 43, humidifier 44 and fan 45 may be similar to those shown in FIG. 1. The operation of this apparatus is similar to that of the apparatus shown in FIG. 1 with the exception that the air, after passing through the fermenting mass, is conducted by the return conduit 42 back to inlet duct 43 and recirculated repeatedly through the mass of fermenting material.

It will be seen from the foregoing that the present invention provides a novel and effective apparatus for cultivating microorganisms on a solid or semi-solid substrate. The method and apparatus permits close control over the temperature, humidity and aeration of the fermenting mass so that suitable conditions for optimum growth of the microorganisms may be maintained. The method and apparatus lend themselves readily to large scale cultivation of microorganisms with a maximum of efficiency and economy.

Where the term "semi-solid substrate" is employed herein it will be understood to mean a substrate consisting of solid particles such as moistened fibers or granules but which are sufficiently solid to maintain the porous nature of the mass and permit air and other respiration gases to be passed therethrough. It will further be understood that where the term "air" is used herein, without qualifying the same, it includes not only atmospheric air but any suitable combination of gaseous materials providing an atmosphere suitable for respiration of the microorganisms.

I claim:

1. The method of cultivating microorganisms which comprises inoculating a sterile substrate material consisting essentially of a finely divided solid with a liquid culture of the microorganisms to be cultivated, arranging the inoculated substrate material in a stationary porous uncompacted bed approximately three feet in depth, passing into and through said bed and in contact with all portions thereof a stream of air under a pressure of approximately 6 inches of water, passing the air through a steam jet to heat and humidify the air, then through a water spray to wash and cool the air, and then along a serpentine path to remove entrained moisture prior to passing it through said bed and maintaining said bed stationary during vegetative growth of the microorganisms.

2. The method of cultivating microorganisms which comprises inoculating a sterile substrate consisting essentially of a finely divided solid material with the microorganisms to be cultivated, arranging said inoculated material in a stationary uncompacted layer not substantially less than approximately four inches in depth, forcing a current of air under pressure of from 0.1 p.s.i. to about 6.0 p.s.i. through said layer of material in direct contact with all portions of such material, heating, humidifying, washing and dewatering the air in the order stated prior to passing it through said material, and maintaining the rate of flow of the air sufficient to maintain the temperature, humidity and aeration of the material approximately optimum for growth of the microorganisms.

3. The invention as set forth in claim 2 wherein the air which has passed through said bed is collected and recycled through said bed, such recycled air being heated, humidified, washed and dewatered prior to being passed through said bed.

4. The invention as set forth in claim 2 wherein the passage of humidified air through said bed is discontinued and thereafter a current of heated, dry air under pressure is passed through the bed without disturbing said bed to dry the substrate material and inhibit further growth of the microorganisms.

References Cited in the file of this patent

UNITED STATES PATENTS

| | | |
|---|---|---|
| 1,756,574 | Takamine | Apr. 29, 1930 |
| 1,961,990 | Sleeman | June 5, 1944 |
| 2,440,545 | Jeffreys | Apr. 27, 1948 |
| 2,491,927 | Martin | Dec. 20, 1949 |
| 2,867,521 | Jeffreys | Jan. 6, 1959 |

FOREIGN PATENTS

| | | |
|---|---|---|
| 536,110 | Great Britain | May 2, 1941 |
| 746,066 | Great Britain | Mar. 7, 1956 |